Figure 1:
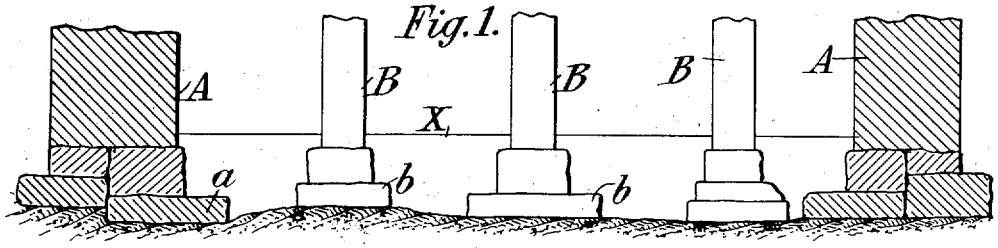

J. B. GOLDSBOROUGH.

METHOD OF UNDERPINNING BUILDINGS, &c.

APPLICATION FILED JUNE 17, 1913.

Reissued Aug. 26, 1913. 13,610.

3 SHEETS—SHEET 1.

WITNESSES:

René Bruine

J. J. Wallace

INVENTOR:

John B. Goldsborough

By Attorneys,

Fraser, Trumbull & Myers

COLUMBIA PLANOGRAPH CO., WASHINGTON, D. C.

J. B. GOLDSBOROUGH.

METHOD OF UNDERPINNING BUILDINGS, &c.

APPLICATION FILED JUNE 17, 1913.

Reissued Aug. 26, 1913.

13,610.

3 SHEETS—SHEET 2.

INVENTOR :

John B. Goldsborough

By Attorneys,

Fraser, Trimble & Myers

WITNESSES:

René Spuine

L. J. Wallace

COLUMBIA PLANOGRAPH CO., WASHINGTON, D. C.

J. B. GOLDSBOROUGH.

METHOD OF UNDERPINNING BUILDINGS, &c.

APPLICATION FILED JUNE 17, 1913.

Reissued Aug. 26, 1913.

13,610.

3 SHEETS—SHEET 3.

WITNESSES:

René Spuine

L. J. Wallace

INVENTOR:

John B. Goldsborough

By Attorneys,

Fraser, Trubd Myers

COLUMBIA PLANOGRAPH CO., WASHINGTON, D. C.

UNITED STATES PATENT OFFICE.

JOHN B. GOLDSBOROUGH, OF CROTON, NEW YORK.

METHOD OF UNDERPINNING BUILDINGS, &c.

13,610. Specification of Reissued Letters Patent. Reissued Aug. 26, 1913.

Original No. 1,063,869, dated June 3, 1913, Serial No. 717,154. Application for reissue filed June 17, 1913. Serial No. 774,235.

*To all whom it may concern:*

Be it known that I, JOHN B. GOLDSBOROUGH, a citizen of the United States, residing in Croton, in the county of Westchester and State of New York, have invented certain new and useful Improvements in Methods of Underpinning Buildings, &c., of which the following is a specification.

My invention relates to the underpinning of buildings, particularly to such buildings as are supported in whole or in part upon isolated piers or columns, and has for its object to provide a new underpinning or foundation for such buildings.

Further objects of my invention are to provide such new foundation before the building is deprived of its original support, also without undermining the original supports, and further to avoid the necessity for temporary supports, shores, needles and braces for such building while the new foundation is being constructed.

A further and important object of my invention is to provide a new foundation or underpinning for such building in such manner as to reduce the interference with the ordinary use, by the occupants of the building, leaving them free and undisturbed and permitting the use of the building to continue in the ordinary manner to a much greater extent than has heretofore been possible by the employment of previous known methods of extending and underpinning building foundations.

A further object is to avoid the shifting of the load at the base of the columns or footings. The maintenance of the load is very important as whenever the load is transferred to and from a footing, there is bound to be at least some upward or downward, or both, movements of the building. A vertical movement in either direction is always a source of danger and frequently results in serious damage to the building.

According to my invention the piers or columns are bonded together, preferably at their base portions, by a new footing which occupies a greatly extended area and consequently has an increased supporting power, which may or may not be provided with foundation elements of a greater depth.

Figure 5:
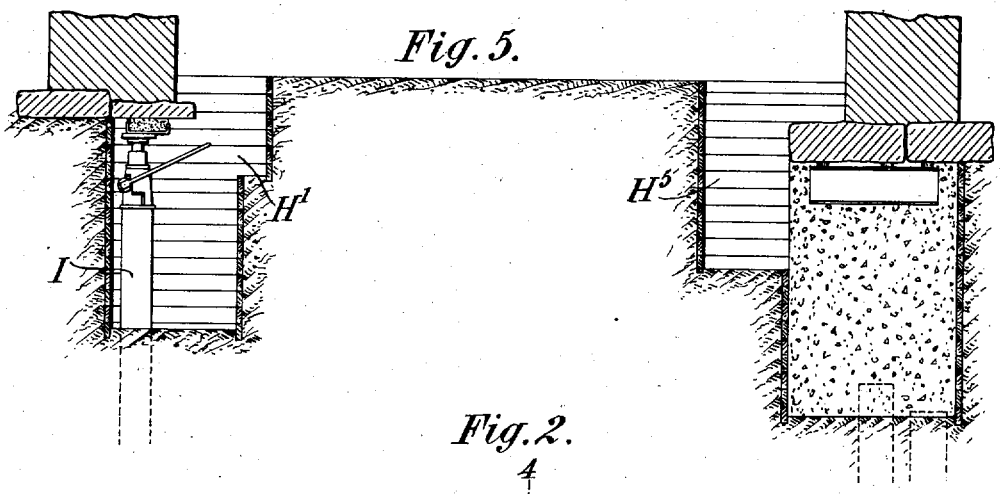
Figure 2:
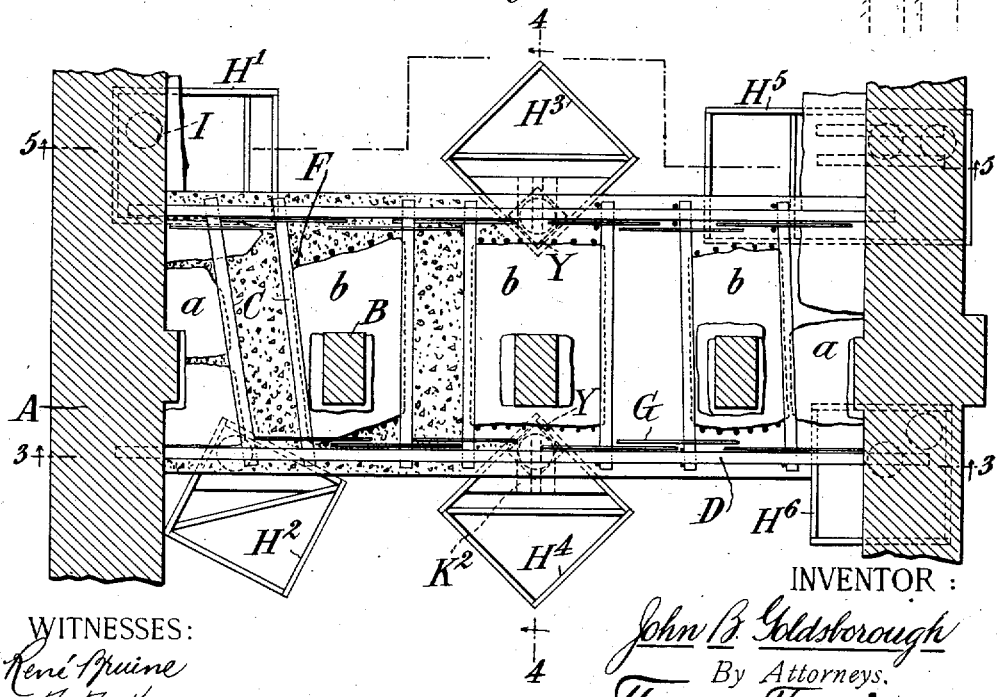
Figure 3:
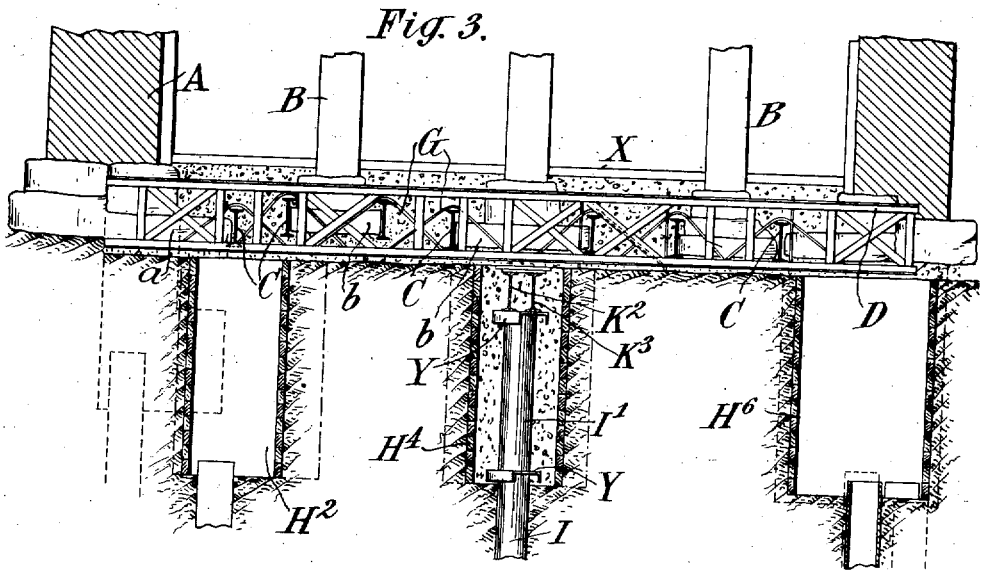
Figure 4:
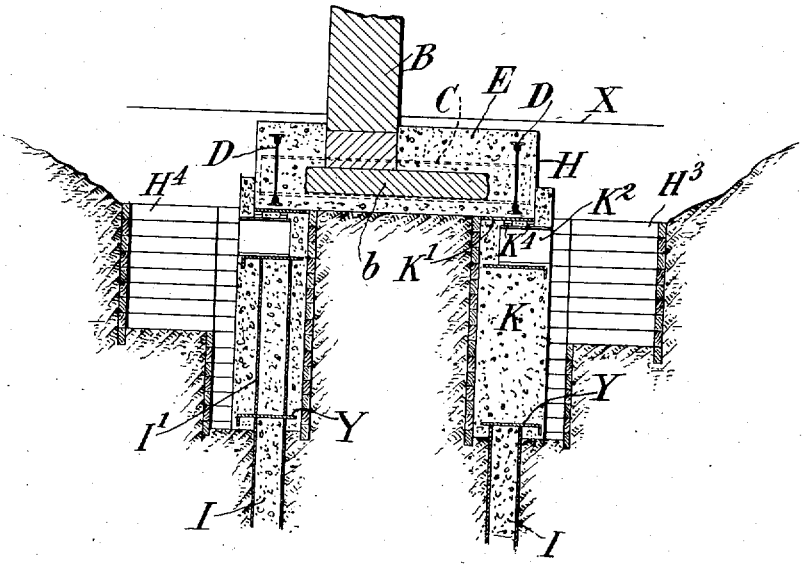
Figure 6:
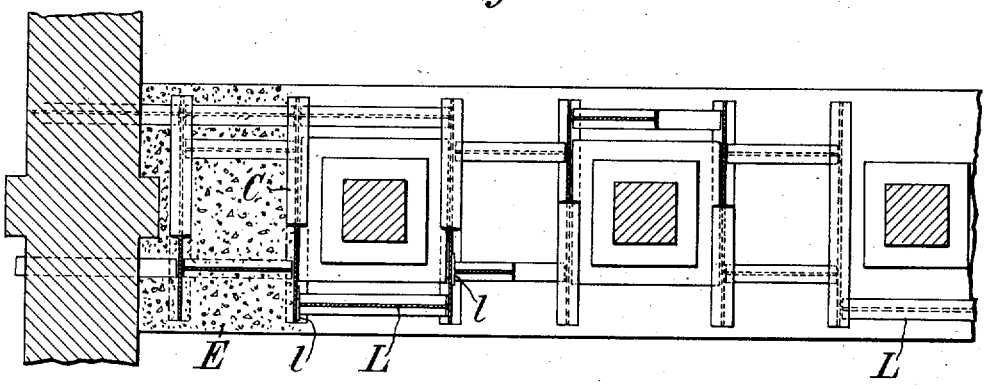
Figure 7:
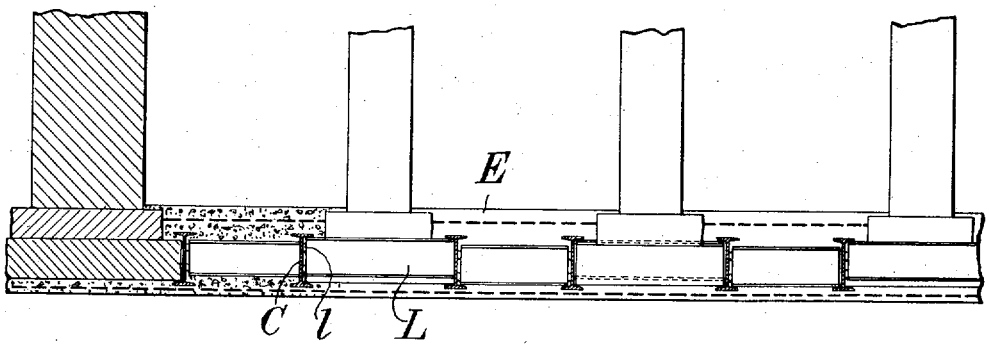

In the accompanying drawings I have illustrated practical embodiments of my invention. Here Figure 1 is a vertical cross-section of the column supports of the front wall of a building which it is desired to underpin. Fig. 2 is a plan view, parts being shown in section, illustrating that stage of my new method of underpinning, wherein the base portions appear bonded together by the new concrete footing, and wherein is illustrated the use of pits for the purpose of sinking foundation elements of greater depth. Parts of the wall and columns of this figure are in section. Fig. 3 is a vertical cross-section of the structure illustrated in Fig. 2 on the line 3—3, Fig. 2. Fig. 4 is a cross-section on the line 4—4, Fig. 2. Fig. 5 is a cross-section on the line 5—5, Fig. 2. Fig. 6 is a plan view partly in section, illustrating the employment of modifications in the method, and Fig. 7 is a front elevation of the structure illustrated in Fig. 6.

In large cities where, as is usually the case, the front of commercial buildings are supported upon piers or columns having isolated footings, it occasionally becomes necessary in connection with great public works, such as subways, etc., to tunnel into the soil a considerable depth below the footings of such piers or columns. This requires that the weight which was previously borne by such footings of such piers or columns, shall be transferred to a new and deeper foundation. The methods of underpinning heretofore in vogue have required that during the process of creating the new underpinning, the earth supporting the footing of such piers or columns shall be removed to permit the erection of the new underpinning. It has consequently been necessary upon the removal of such support to provide temporary supports for the wall being underpinned. Such temporary supports frequently take the form of needles arranged transversely of and suitably secured to the wall being underpinned and supported at their ends upon the cribs. Other shores or braces may be employed. This method of temporary support is objectionable in that it requires the weight of the building to be transferred from its previous support to a new support, and also in that the large mass of timbers, needles, shores, braces, cribbing, etc., interfere with the work in the process of construction, and, further, usually interfere with the interior of the building which is being underpinned.

According to my invention the piers or columns upon which a wall of the building is supported may be underpinned without removing the original foundation or soil supporting the footing of such piers or columns, and the area of the footing of such piers or columns may be greatly increased, and if it is desired foundation elements may be provided and carried to a greater depth and suitably connected to the new underpinning of such piers or columns, and the provision of the new foundation does not necessitate any temporary support of the building, during underpinning.

In Fig. 1, A A are the side walls of a building, the front of which is carried partly upon the front of such side walls and partly upon piers or columns B. Footings *a b* are provided for the said side walls A and piers B. The said side walls and piers are illustrated as having their footings resting upon the soil a short distance below the floor level X which is usual in constructions of the character referred to. Such footings are perfectly safe and will sustain a large weight when undisturbed. If, however, for any reason it becomes necessary to excavate the adjacent soil below the level of the supports for the said footings, means must be provided to increase the supporting area of the said footings, and frequently to extend the foundation elements to a lower level. According to my invention the earth is preferably excavated to substantially the bottom of the footings *a b*. It will be perceived that the soil beneath the footings *a b* is not disturbed and therefore its original supporting power is not impaired. I then cause suitable supporting members to be brought into engagement with the lower parts of the piers B and walls A or their foundations, and an excellent manner in which this step may be performed is by causing the flanges of I beams C to pass beneath the lower surface of the footings *a b*. I prefer to locate a portion of each supporting beam beneath a part of the footings of the columns when such footings are suitable for this purpose, but such location is not essential and if, as occasionally happens, the footing is not suitable for the purpose the beam may engage a suitable part of the base portion of the column above the footing, for instance by having its flange inserted therein. I preferably arrange the said I beams one upon each side of the footings *b* of the piers and one at the exposed side of the footings *a* of the walls A. Means are then provided for connecting these I beams together and for spacing them apart and holding them in position. As illustrated in Figs. 1 to 5 such means take the form of lattice beams D, which are well illustrated in Fig. 3 and which are arranged longitudinally of the front wall of the building and in line with the footings *a b*. Two of such beams are preferably provided, one of which is located on each side of the footings *a b*, and they are arranged with their webs vertical, and the ends of the I beams C pass through openings in the lattice work of the said beams whereby the I beams C are retained in position. Thereupon by the aid of a suitable form or mold, if necessary, I cause a mass of suitable plastic material, such as concrete, to be placed in position whereby it completely embeds and surrounds the footings *a b*, the supporting beams C and the connecting beams D. This mass of concrete extends on each side of the footings *a b* to a point sufficiently beyond the ends of the I beams C and the beams D to completely embed the same, and it extends throughout between the walls A A. It is preferably made considerably thicker than the original footings *a b* and may well have a depth of, say, 30 inches. Thereby a new foundation or footing will be produced which may have an area increased in size as much as desired beyond the area of the original footing. This will possess a great strength against fracture by reason of the intrinsic strength of the material employed, and likewise by reason of the fact that the supports C not only serve to transfer the weight of the building directly from the footings of the wall and column to the said new supports and to reinforce the same, but also because the new support or foundation is greatly reinforced by the longitudinal lattice beams D. If desired additional reinforcements may be provided and these may well take the form of the small rods F arranged vertically at the front and rear sides of the footings *b*, as seen in Fig. 2. If desired, additional longitudinal reinforcing rods G may also be provided.

For some purposes the greatly increased bearing afforded by the increased area of the new foundation, which as a whole I shall call H, may be sufficient. But should it, however, be desired to carry the foundation down and provide ample support at a lower depth which is beyond reach of the future disturbance of the soil, my method lends itself well to the construction of such new and deep foundations. It will be perceived that the new footing or underpinning H is of greatly increased size over the original footings *a b* and is more than sufficient to carry the load borne by the original footings. Therefore, while it would endanger the safety of the building to undermine the footings *a b*, it will by reason of the provision of the new footing H which bonds together footings *a b* and provides a new unitary footing of greatly increased area and strength, be perfectly safe to undermine this new footing H sufficient to install underpinning cylinders. Accordingly in Fig. 2 I have illustrated the construction of pits beneath the said footing H and these pits I shall designate $H^1$, $H^2$, $H^3$, $H^4$, $H^5$, $H^6$. Each pit is sunk so that only as much thereof will be beneath the footing H as is necessary to install the underpinning cylinders, and thereby the minimum amount of material beneath the footing is removed. The said pits are constructed in the usual manner, of sheet piling suitably driven into the earth and are made large enough to provide suitable working room for the men. The pits $H^1$, $H^5$, $H^6$ are located in position to enable suitable foundation elements, such as underpinning cylinders I, to be driven into the soil beneath the side walls A, and pits $H^2$, $H^3$, $H^4$ are located so that similar foundation elements may be driven into the earth under the footing H. When the said pits have been carried to a proper depth, iron cylinders may be located at the floor of the pit, and by means of a jack reacting against the underside of the foundation H the cylinder may be driven into the soil. A water jet if desired may be employed to aid in sinking the cylinder. When the cylinder has been driven to a firm substrata which is capable of supporting the necessary weight, it may be cleaned out and if desired filled with concrete and suitably connected to the footing H. Such connection may well take the form of an iron cap or beam Y which may be placed upon the top of the cylinder and upon which in turn may be placed a column K of concrete with which the pits may wholly or partly be filled and which may be connected to the footing H by suitable plates $K^1$, beams $K^2$, $K^3$ and wedges $K^4$. In Fig. 4 I have illustrated on the right hand side the employment of a concrete column K connecting the footing H to the deep foundation elements I, whereas on the left hand side of said figure, a cylinder section $I^1$ is illustrated as employed for this purpose. My invention is not concerned with the manner of sinking deeper foundation elements, but rather with the provision of means whereby such deeper foundation elements may simply be inserted beneath the wall or piers without requiring temporary supports for the building during the process. Any suitable manner of constructing deeper foundations may be employed. The pits may be filled with concrete. Piles may be driven in the pits, and any other of the known methods may be made use of. Nor does my invention require the presence of the I beams C as the supporting members or the braces whereby the weight of the building is transferred to the new foundation H. These I beams are I believe the most desirable form of construction for this purpose. Other forms of continuous beams might be used and supports or hangers might be used that are not continuous. Furthermore, my invention is not necessarily present only in the case of the particular construction of longitudinal beams D, as other braces may be employed for reinforcing the concrete and for retaining the supports C in place. Thus in Fig. 6 I have illustrated the employment of I beams C as the supporting members, but in place of the integral longitudinal beams D there are employed beams L which are preferably I beams and fit closely between adjacent beams C. The said beams L are caused to fit tightly between the beams C by reason of wedges *l* which are driven to retain them in position. By the employment of these short wedge-held beams L, I am enabled to provide a structure which is fully as stiff as though the integral beams D were employed. As a matter of fact, even before the concrete E is placed around the said beams C, L, so as to embed the same, the rigidity of the structure is such that it possesses an enormous capacity of resistance against sidewise strain and is practically an integral foundation. The subsequent addition of the concrete E produces a footing of great strength.

Whether or not the footing H be reinforced in one or the other way, or whether one or the other way be employed of bonding together the foundation elements, the strength of the footing will be such that in sinking the cylinder I it is perfectly safe to jack against any part of the footing H without fear of rupture.

The foregoing invention presents a simple and efficient means of bonding together isolated foundations so that they practically become an integral foundation, and enables a building supported on such isolated foundation to be underpinned without the employment of temporary supports, needles, shores or braces in as satisfactory a manner as though this part of the building had been supported on an integral wall. Thereby this hazardous operation is made as safe as any operations of this character can be made. It is well understood that underpinning operations are in themselves the most difficult and dangerous which the builder and contractor are called upon to perform.

The invention herein described has gone into practical use and has been satisfactorily employed in a number of cases. It has been found that the use of the said invention is less expensive than the temporary or the permanent beam girders, timbers, needles, shores, braces, or other arrangement heretofore used in connection with the underpinning of separate piers. My said extended footing becomes a permanent strengthening and reinforcement of the building and can be placed entirely below the floor levels so that it affords no interference with the use of the floor space of the building or between the columns, the footings of which have been extended and connected together.

In many applications of my invention it has been found that it is not necessary to enter within the building for the purpose of employing the said invention. A number of buildings have been underpinned according to my invention wherein the operations were conducted entirely from the outside. The dirt from around the columns was removed from underneath the basement floor. In this case temporary partitions between the columns effectually shut off all annoyance from dirt or intrusion by workmen, or by the elements. In the usual methods of underpinning such buildings the dust that is inseparable from such work, the litter and the noise constitute a great nuisance to the occupants of the building and interfere with its regular use. By my method these annoyances and nuisances are reduced or wholly abated.

By the use of my invention I have been able to underpin piers and walls surrounding elevated machinery, and likewise elevators for passenger and freight in high office buildings and lofts. All of the operations of extending the footing and underpinning the walls were carried on from the street side underneath the floor without disturbing the floor inside of the building line. By ordinary methods it would necessarily have seriously interfered with the operation of the elevators and have caused great expense in removing and re-installing the machinery that was located in the basement near the bottom of the shafts for such purpose. The cost of moving such machinery and re-arranging the same and establishing connections for the temporary operation of the elevator during the underpinning of the building, would, in most cases, cost several times as much as the entire expense involved by placing my extended footings under the said elevator supports as described, besides the advantage that by my method the building is free from exposure to the elements. It will be seen, therefore, that both economy and other advantages are derived from the use of my said invention. It will also be apparent to those skilled in such matters that in addition to increasing the support of the building or other structure in a vertical plane, my invention adds great stability to the building by preventing any lateral or longitudinal movement of the piers. This is a very important feature as when deep excavations are made, such as that occasioned by the construction of a subway or the excavation for a deep foundation adjacent to an erected building, it will be possible if the piers are separately supported for the corner, for instance, to move, even though it be securely underpinned to a firm substrata. Lateral pressure of the earth toward the excavation might tend to cause a lateral movement at the foot of the old pier where it rests upon the new underpinning. By the use of my invention, however, the piers are all firmly joined together at their bases, providing a unitary footing of increased supporting power, and by this separate movement of the footings of the piers is prevented. As well the transverse strength of the foundation provided according to my invention is very great for the reasons herein fully set forth. Another most important advantage of my invention is the great saving in time. Hitherto in the use of previous methods of underpinning the said structures wherein temporary supports were provided, it has occurred that buildings rested on such temporary supports for substantially one year, due, perhaps, to the fact that the adjacent excavations took longer than had been expected and that the employment of the temporary supports was continued until the adjacent operations were concluded. By the use of my invention a new and extended footing can be prepared often in as short a time as two days, and this extended footing is constructed without the smallest interference with the use of the building even if the precautions above taken to avoid intrusion on the interior of the building are not made use of.

It will be gathered from the foregoing that my invention does not necessarily reside in its use in connection with the particular instrumentalities which I have illustrated. Other devices may be employed and other means made use of within the appended claims.

What I claim is:—

1. The method of underpinning the wall of a building or other structure supported on columns, which consists in locating supporting beams each with a portion thereof in engagement with a part of one of said columns, in then locating braces between the lower ends of said columns whereby said columns are braced against relative movement, in then forming a bed of concrete or the like upon the ground about the said columns, and embedding a portion of said supporting beams and the said braces in said concrete.

2. The method of underpinning the wall of a building or other structure supported on separated columns, which consists in locating supporting beams each with a portion thereof underlying a part of the base portion of one of said columns, in then connecting the said beams by longitudinal connecting members whereby the several columns are bonded together, in then forming a bed of concrete or the like upon the ground about the base portions of the said columns, and embedding said supporting beams and said connecting members in said concrete.

3. The method of underpinning the wall of a building or other structure supported on separated columns, which consists in locating supporting beams each with a portion thereof underlying a part of the base portion of one of said columns, in then connecting the said beams by longitudinal connecting members whereby the several columns are bonded together, in then forming a bed of concrete or the like upon the ground around the base portions of the said columns, and embedding said supporting beams and said connecting members in said concrete, and in then constructing pits under said concrete footing, installing foundation elements in said pits and connecting said deeper foundation elements to said concrete footing.

4. The method of underpinning the wall of a building or other structure supported on columns, which consists in locating I beams with their flanges in engagement with the base portions of the columns, in then forming a bed of concrete or the like around the base portions of said columns and embedding said I beams therein.

5. The method of underpinning the wall of a building or other structure supported on columns, which consists in locating I beams with their flanges in engagement with the base portions of the columns, in then locating longitudinal beams and connecting them to said I beams therein, in then forming a bed of concrete or the like around the base portions of said columns and embedding said I beams and said longitudinal beams therein.

6. The method of underpinning the wall of a building or other structure supported on columns, which consists in locating I beams with their flanges in engagement with the base portions of the columns, in then forming a bed of concrete or the like around the base portions of said columns and embedding said I beams therein, and in then locating pits at desired intervals under said concrete footing, installing foundation elements in said pits and connecting said deeper foundation elements to said concrete footing.

7. The method of underpinning the wall of a building or other structure supported on columns, which consists in locating I beams with their flanges in engagement with the base portions of the columns, in then forming a bed of concrete or the like around the base portions of said columns and embedding said I beams therein, and in then locating pits at desired intervals under said concrete footings, and driving column sections in said pits to a firm substrata beneath said concrete footing by means of jacks reacting against said extended footing, and connecting said deeper foundation elements to said concrete footing.

8. The method of underpinning the wall of a building or other structure supported on columns, which consists in excavating the soil to the footings of said columns, in then locating I beams transversely with a flange of each beam under the footing of a column, in then arranging longitudinal beams in position to brace said I beams apart and hold them in position, in then forming a bed of concrete or the like around the base portions of said columns, and embedding said transverse and longitudinal beams therein.

9. The method of underpinning the wall of a building or other structure supported on columns, which consists in excavating the soil to the footings of said columns, in then locating I beams transversely with a flange of each beam under the footing of a column, in then arranging longitudinal beams in position to brace said I beams apart and hold them in position, in then forming a bed of concrete or the like around the base portions of said columns, and embedding said transverse and longitudinal beams therein, and in then locating pits at desired intervals under said concrete footings, installing foundation elements in said pits and connecting said deeper foundation elements to said concrete footing.

10. The method of underpinning the wall of a building or other structure supported on columns, which consists in locating I beams transversely with a flange of each beam under the footing of a column, in then connecting longitudinal beams to said transverse beams so as to support them, in then forming a bed of concrete or the like around the base portions of said columns, and embedding said transverse and longitudinal beams therein.

11. The method of underpinning the wall of a building or other structure supported on columns, which consists in locating I beams transversely with a flange of each beam under the footing of a column, in then connecting longitudinal beams to said transverse beams so as to support them, in then forming a bed of concrete or the like around the base portions of said columns, and embedding said transverse and longitudinal beams therein, and driving column sections in said pits to a firm sub-strata beneath said concrete footing by means of jacks reacting against said concrete footings, and connecting said deeper foundation elements to said concrete footings.

12. A foundation for buildings or other structures supported in whole or in part upon independent columns, comprising a new and extended footing of concrete or the like located in substantially the level of the original base portions of such columns and surrounding the same, and means for connecting such extended footing to the original base portions of such columns comprising beams each of which has a portion engaging under a portion of one of said columns and which are embedded within such extended footing, whereby the columns are bonded together and a new footing of extended area is provided.

13. A foundation for buildings or other structures supported in whole or in part upon columns, comprising an integral lateral extension from the original footings of such columns of concrete or the like, I beams having their flanges located under said original footings and embedded in such lateral extension so as to transfer a load thereto.

14. A foundation for buildings or other structures supported in whole or in part upon columns, comprising an integral lateral extension from the original footings of such columns of concrete or the like, I beams having their flanges engaging parts of the base portions of such columns and located transversely thereof, and longitudinal beams connecting said I beams, said I beams and longitudinal beams embedded in said extended footings and serving to distribute the load thereto.

15. The method of supporting the wall of a building or other structure, supported on separated columns, which consists in excavating to the bases of said columns and then locating horizontal beams each with a portion thereof underlying a part of the base portions of one of said columns, and in then forming a unitary bed of concrete or the like upon the ground around the base portions of the said columns and at substantially the same level, and in contact with the said base portions and with said horizontal beams, whereby said beams serve to reinforce said concrete and to form a connection between the base portion of said columns and said concrete, and whereby a new foundation is created of extended area, which binds the several columns together without undermining the original foundation.

16. The method of underpinning the wall of a building or other structure supported on separated columns, which consists in excavating substantially to the footings of said columns, locating beams in position relative to the footings of said columns so that a portion of each of said beams is beneath a portion of one of said footings, in then forming a bed of concrete or the like about the base portions of all of said columns, and embedding portions of said beams therein, whereby a new footing of extended area for all said columns is provided which receives part of the load and whereby the said columns are bonded together.

17. The method of underpinning the wall of a building or other structure without removing the soil below the level of the original footings which consists in excavating substantially to the level of said footings, in locating beams in position relative to such footings so that a portion of each of said beams is beneath a portion of said footings and a portion thereof is above the base of said footings, in then forming a bed of concrete or the like about the base portions of said footings substantially on the same level, and embedding portions of said beams therein, whereby a new footing of extended area is provided and a part of the load of said wall is transferred thereto.

Signed at 290 Broadway, N. Y. city this 12th day of June, 1913.

JOHN B. GOLDSBOROUGH.

Witnesses:
JULES R. BORUCHAND,
CHARLES B. SPENCER.

Copies of this patent may be obtained for five cents each, by addressing the "Commissioner of Patents, Washington, D. C."